US009622036B1

United States Patent
Jintaseranee et al.

(10) Patent No.: US 9,622,036 B1
(45) Date of Patent: Apr. 11, 2017

(54) METHOD AND SYSTEM FOR ESTIMATING AND USE OF DEVICE LOCATION BASED ON RADIO FREQUENCY SIGNATURE OF COVERAGE FROM A SINGLE BASE STATION

(71) Applicant: Sprint Spectrum L.P., Overland Park, KS (US)

(72) Inventors: Kosol Jintaseranee, Millbrae, CA (US); Mark Evans, El Granada, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/197,053

(22) Filed: Jun. 29, 2016

(51) Int. Cl.
*H04W 24/00* (2009.01)
*H04W 4/02* (2009.01)
*H04M 7/00* (2006.01)
*H04L 29/08* (2006.01)
*H04B 17/318* (2015.01)
*H04B 17/336* (2015.01)
*H04W 72/04* (2009.01)

(52) U.S. Cl.
CPC .......... *H04W 4/023* (2013.01); *H04B 17/318* (2015.01); *H04B 17/336* (2015.01); *H04L 67/306* (2013.01); *H04M 7/0003* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 9,226,258 B2 | 12/2015 | Jintaseranee et al. | |
| 9,326,096 B1 | 4/2016 | Gatmir-Motahari et al. | |
| 2014/0128094 A1* | 5/2014 | Olson | G01S 5/145 455/456.1 |
| 2015/0087330 A1* | 3/2015 | Prechner | G01S 5/14 455/456.1 |

OTHER PUBLICATIONS

U.S. Appl. No. 13/967,790, filed Aug. 15, 2013.

* cited by examiner

*Primary Examiner* — Suhail Khan

(57) ABSTRACT

A computing system includes or has access to data records that associate (i) radio frequency (RF) signatures of device coverage from a base station with (ii) locations of devices corresponding with the RF signatures. When a device whose location is at issue is then within coverage of that base station, the computing system receives an RF signature of the device's coverage from the base station, and the computing system (i) finds multiple data records whose RF signatures of coverage from the base station most closely match the received RF signature, (ii) based on the device locations in the multiple data records, determines a representative bearing from the base station and a representative distance from the base station, and (iii) estimates the device's location to have the determined representative bearing and determined representative distance. The estimated device's location may then be used as a basis to provide a location-based service.

20 Claims, 4 Drawing Sheets

METHOD AND SYSTEM FOR ESTIMATING AND USE OF DEVICE LOCATION BASED ON RADIO FREQUENCY SIGNATURE OF COVERAGE FROM A SINGLE BASE STATION

BACKGROUND

A typical wireless communication system includes one or more base stations that radiate to define wireless coverage areas in which to serve mobile stations according to a radio access technology such as Orthogonal Frequency Division Multiple Access (OFDMA (e.g., Long Term Evolution (LTE) or Wireless Operability for Microwave Access (Wi-MAX)), Code Division Multiple Access (CDMA) (e.g., 1xRTT and 1xEV-DO), GSM, GPRS, UMTS, EDGE, TDMA, AMPS, MMDS, WIFI, and BLUETOOTH, or others now known or later developed. Each base station may then be coupled with network infrastructure that provides connectivity with one or more transport networks, such as the public switched telephone network (PSTN) and/or the Internet for instance. With this arrangement, a wireless communication device (WCD) within coverage of the system could engage in air interface communication with one or more base stations and could thereby communicate via the base station(s) with various remote network entities or with other WCDs served by the base station(s) or by other base stations.

One of the more important features of modern wireless communication systems is the ability to determine the location of a WCD. Knowledge of a WCD's location could help facilitate various location-based services.

WCD location could be determined in various ways, and with varying levels of granularity. In a typical arrangement, for instance, the system could generally estimate WCD location by triangulating based on signal delay between the WCD and each of three base stations, using signal delay with respect to each base station as a measure of distance of the WCD from the base station, and deeming the WCD's location to be within an area of overlap of circles with radii equal to those distances. Further, the system could determine the WCD's location with more granularity, such as by having the WCD tune to Global Positioning System (GPS) satellites in the sky over the WCD's generally determined location, and using signals received from the satellites to precisely triangulate the WCD's location.

OVERVIEW

While such techniques could work well to determine the location of a WCD, limitations exist when a WCD is within coverage of just a single base station. In that scenario, it would not be possible to triangulate the location of the WCD based on signal delay between the WCD and each of three base stations. Rather, the best general determination of the WCD's location with respect to the base station might be the full coverage area of the base station. In addition, for one reason or another, it may not be possible to determine the location of the WCD based on GPS satellite signals or the like. Thus, an improved mechanism for determining the location of a WCD based on coverage of the WCD from a single base station would be desirable.

Disclosed herein is a method and system to facilitate this. In accordance with the disclosure, a computing system will include or have access to data records that associate (i) radio frequency (RF) signatures of WCD coverage from the base station with (ii) locations of the WCDs corresponding with the RF signatures. When a WCD whose location is at issue is then within coverage of that base station, the computing system will receive an RF signature of the WCD's coverage from the base station, and (i) the computing system will query the data records to find multiple records whose RF signatures of coverage from the base station most closely match the received RF signature of the WCD, (ii) based on the WCD locations in the multiple data records, the computing system will determine a representative bearing from the base station and a representative distance from the base station, and (iii) the computing system will estimate the WCD's location to have the determined representative bearing and determined representative distance. The computing system may then use the estimated WCD location as a basis to provide a location-based service.

Accordingly, in one respect, disclosed is a method for estimating and use of device location based on an RF signature of wireless coverage from a single base station, where the base station is positioned at a location. The method includes, for a plurality of first WCDs that are or were provided with coverage from the base station, storing data records that associate (i) RF signatures of the first WCDs' coverage from the base station with (ii) locations of the first WCDs corresponding with the RF signatures, where the locations of the first WCDs define bearings from the base station's location and distances from the base station's location. Further, the method includes, for a second WCD provided with coverage from the base station, receiving an RF signature of the second WCD's coverage from the base station. And the method includes querying the stored data records to identify multiple data records whose RF signatures most closely match the RF signature of the second WCD's coverage of the base station.

The method then includes combining the bearings defined by the locations of the identified multiple data records to establish a representative bearing from the base station, and combining the distances defined by the locations of the identified multiple data records to establish a representative distance from the base station. And the method includes, based on the established representative bearing and the established representative distance, estimating as a location of the second WCD a location that has the established representative bearing from the base station and the established representative distance from the base station. The method then includes using the estimated location of the second WCD as a basis to provide a location-based service.

Further, in another respect, disclosed is a system for estimating of device location based on a radio frequency (RF) signature of coverage from a single base station, where the base station is positioned at a location. The system includes one or more processors, non-transitory data storage, data records stored in the data storage, and program instructions stored in the data storage and executable by the one or more processors to carry out operations such as those noted above.

In line with the discussion above, the data records stored in the data storage associate (i) RF signatures of first WCDs' coverage from the base station with (ii) locations of the first WCDs corresponding with the RF signatures, where the locations of the first WCDs define bearings of the first WCDs from the base station's location and distances of the first WCDs from the base station's location. And the program instructions stored in the data storage are executable by the one or more processors to (a) receive an RF signature of a second WCD's coverage from the base station, (b) query the stored data records to identify multiple data records whose RF signatures most closely match the RF signature of the second WCD, (c) combine the bearings defined by the locations of the identified multiple data records to establish a representative bearing from the base station, and combine the distances defined by the locations of the identified multiple data records to establish a representative distance from the base station, (d) based on the established representative bearing and the established representative distance, estimate as a location of the second WCD a location that has the established representative bearing from the base station and the established representative distance from the base station, and (e) use the estimated location of the second WCD as a basis to provide a location-based service.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

Figure 1:
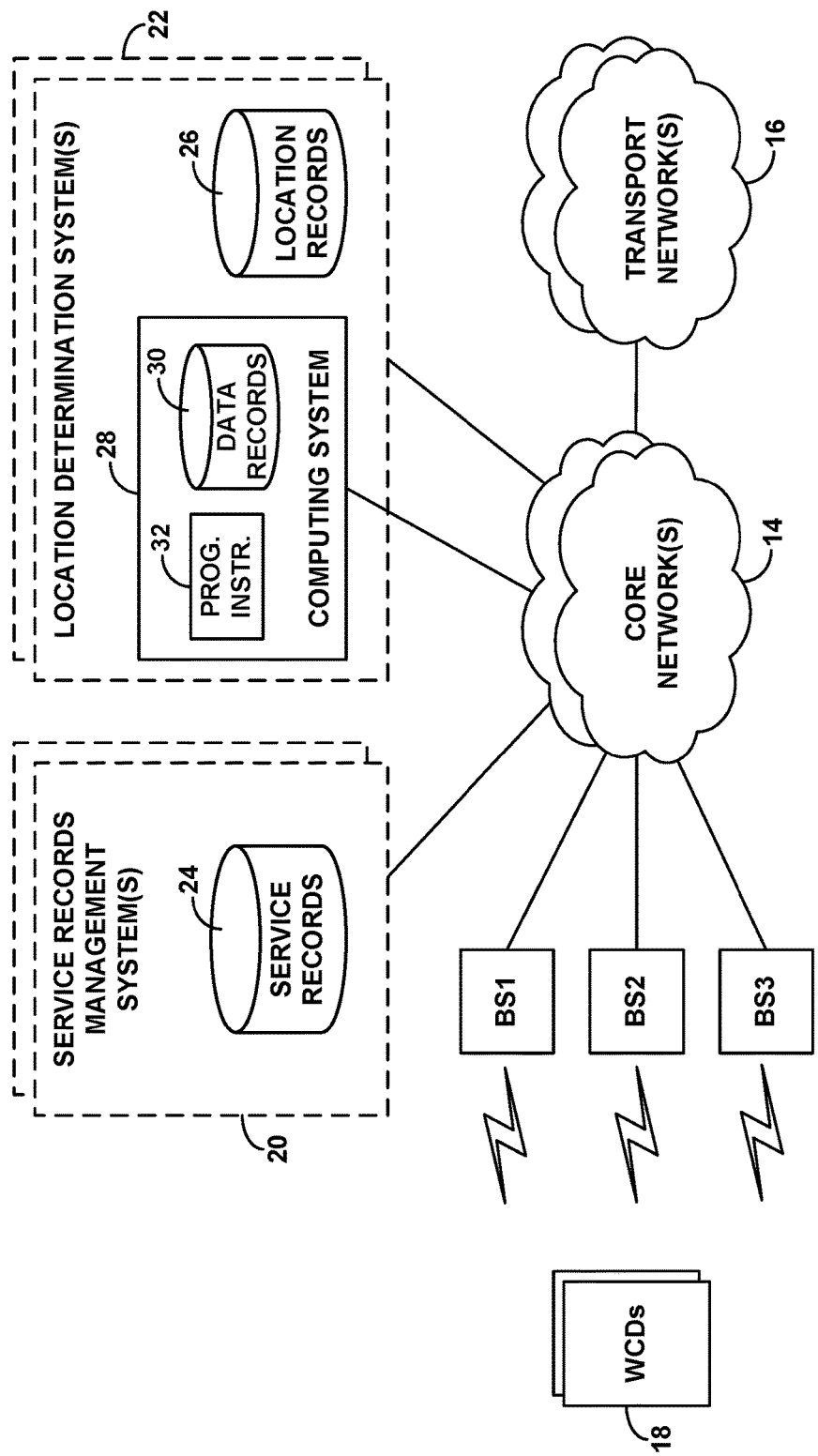
FIG. 1 is a simplified block diagram of an example communication system in which features of the present disclosure can be implemented.

Referring to the drawings, as noted above, FIG. 1 is a simplified block diagram of an example communication system in which the present method can be implemented. It should be understood that this and other arrangements and processes described herein are set forth for purposes of example only, and other arrangements and elements (e.g., machines, interfaces, functions, orders of elements and functions, etc.) can be added or used instead and some elements may be omitted altogether. Those skilled in the art will also appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

As shown in FIG. 1, the example communication system includes three example base stations, BS1, BS2, and BS3, coupled with one or more core networks 14 that provide connectivity with one or more transport networks 16 such as the PSTN and/or the Internet. The base stations and core networks could be operated by one or more wireless service providers and/or end-users and could be components of a common system or multiple separate systems.

In an example arrangement, for instance, some or all of the base stations and core network(s) could be components of an LTE system, with the base stations being evolved-Node-Bs (eNodeBs) and the core network including one or more mobility management entities (MMEs), serving gateways (SGWs), and packet data network gateways (PGWs) providing connectivity with one or more packet-switched transport networks. Further, some or all of the base stations and core network(s) could be components of a CDMA system, with the base stations being base transceiver stations (BTSs) or access nodes (ANs) and the core network including one or more base station controllers (BSCs), radio network controllers (RNCs), mobile switching centers (MSCs) providing connectivity with the PSTN, and packet data serving nodes (PDSNs) providing connectivity with one or more packet-switched transport networks. And still further, some or all of the base stations and core network(s) could be components of a wireless local area network (WLAN), with the base stations being WIFI access points and the core network including one or more routers or the like providing connectivity with one or more packet-switched transport networks. Numerous other examples are possible as well.

In general, each base station may include an antenna structure, power amplifier, and transceiver, and may be configured to radiate so as to define one or more coverage areas such as a cell and one or more cell sectors. Each base station may have a unique base station identifier, and each coverage area may have a unique coverage area identifier, and the base station and core network may have records of these identifiers, to facilitate recording the identifiers when establishing records of WCD operation. Further, each base station and coverage area may have other characterizing information, such as geographic location, azimuth, coverage range, centroid, and the like, and the base station and core network may also have records of this information to facilitate recording the information when establishing records of WCD operation.

In practice, the base stations may include macro base stations of the type typically covering a wide area and often including antennas mounted on tall towers or other structures. Alternatively or additionally, the base stations may include femtocells, small cells, repeaters, or the like, which may have a smaller form factor and be configured for use within homes, offices, or other areas and to connect with the core network through wired or wireless backhaul connections or other means.

Each base station may be configured to provide a reference signal, pilot signal, or the like, for use by WCDs to detect and evaluate coverage from the base station. For example, an LTE eNodeB may regularly broadcast a reference signal on particular subcarriers, for evaluation by WCDs within coverage of the eNodeB. And a CDMA BTS may regularly broadcast a pilot signal on a particular Walsh-coded channel, for evaluation by WCDs within coverage of the BTS.

FIG. 1 depicts a number of representative WCDs 18 that may be configured to receive coverage from one or more of the illustrated base stations. These WCDs could include cell phones, wirelessly equipped tablets or other computers, embedded wireless modules, tracking devices, or other devices now known or later developed. In practice, any of these WCDs may support service from under one or more radio access technologies. Further, each WCD may have a unique WCD identifier, such as an international mobile subscriber identity (IMSI), a mobile station identifier (MSID), a mobile identification number (MIN), an electronic serial number (ESN), or the like, which the WCD may report when registering and/or engaging in other communications via one or more of the base stations.

A representative WCD includes one or more radios and other components to facilitate communicating with one or more base stations. Using such a radio, the WCD may receive and evaluate reference or pilot signal strength from a base station, evaluate signal delay between the WCD and the base station, and engage in useful communication with the base station, such as registering for service, reporting coverage information such as signal delay, signal strength, signal-to-noise ratio, and engaging in call or data session communication, among numerous other examples.

Shown on the core network(s) 14 are various entities including one or more service-records management systems 20 and one or more location determination systems 22.

A representative service records management system 20 operates to receive, maintain, and report records 24 of WCD service, including information about coverage that WCDs received from one or more base stations, keyed to WCD identifier and time of service. An example of such a system includes a per call management data (PCMD) server, which may receive records of WCD registrations, calls, data sessions, or other service related to WCDs to facilitate billing and other service, and which may include information about base station coverage detected by WCDs, such as base station identifiers, measurements of reference signal receive strength (RSRP) per base station, reference signal receive quality (RSRQ) such as signal-to-noise ratio per base station, and air interface signal delay per base station. The service records management system 20 may receive some such information from base stations serving WCDs, where WCDs report the information to the base stations and the base stations forward the information directly or indirectly to the service records management system 20. Further, the service records management system 20 may receive some such information from other sources, such as from one or more location determination systems or the like.

A representative location determination system 22 operates to determine, maintain, and report records of WCD location 26, keyed to WCD identifier and time of determination. The location determination system 22 could determine WCD location in various ways, such as those discussed above. By way of example, the location determination system could determine the general location of a WCD by triangulating based on WCD reports of signal delay with respect to three or more base stations. And as another example, the location determination system could more determine the location of a WCD more specifically by receiving WCD reports of signals from GPS satellites and triangulating based on those signals. The location determination system could engage in control plane or user plane communication with the WCD to facilitate these or other location determination processes.

The location determination system could determine the location of a WCD in response to various triggers. For example, the location determination system could be set to track the location of a WCD and could thus autonomously determine the location of the WCD periodically. As another example, the location determination system could receive from another system, such as a WCD-support center, an emergency-services call center, or a commercial location-based service provider, a request for location of the WCD and could responsively determine and report the location of the WCD. As the location determination system determines the location of a WCD, the location determination system may record the determined location, optimally as geographic location coordinates (e.g., latitude and longitude coordinates) keyed to the WCD's identifier and a current timestamp.

In accordance with the present disclosure, a computing system 28 will operate to establish data records 30 that associate RF signatures of coverage from a single base station with locations of WCDs corresponding with the RF signatures, and to use those data records as a basis to estimate the location of a given WCD based on coverage that the WCD receives from that single base station. FIG. 1 depicts such a computing system 28 as part of the location determination system 22, but the computing system could be provided elsewhere, possibly integrated with other entities. As shown by way of example, the computing system 28 includes program instructions 32, which could be executable by one or more processors to implement this process.

The computing system may first engage in a learning process, to establish the data records 30. In practice, the learning process may include receiving WCD service records and WCD location records, and using WCD identifier and timestamp information cooperatively as a basis to correlate those records. The computing system could receive the WCD service records from various sources, such as from service records management system 20, through a push or pull process. Further, the computing system could receive the WCD location records from various sources, such as from other components of the location determination system 22, also through a push or pull process. A goal here is to correlate WCD service records having a particular WCD identifier and timestamp with WCD location records having the same WCD identifier and the same or substantially similar timestamps (e.g., within a reasonable time range, such as a minute or so).

For each correlation between a WCD service record and a WCD location record, the computing system may then establish at least one data record, with each data record being specific to a single base station and specifying or otherwise indicating an RF signature of the WCD's coverage from the base station and the corresponding WCD location.

In practice, for instance, a WCD service record could indicate that, at a particular time, a WCD having a particular identifier received coverage from each of base stations BS1, BS2, and BS3 having respective identifiers, and could specify respectively for each base station an RF signature of the WCD's coverage from the base station, including for instance, air interface signal delay, downlink receive signal strength, and downlink receive signal-to-noise ratio.

Further, a WCD location record could indicate that the same WCD (having the same or corresponding WCD identifier) was located at particular geographic coordinates, perhaps having been determined using GPS or the like. Given those records, the computing system could establish three data records, one respectively for each of the base stations. Each data record could associate the RF signature of the WCD's coverage from a particular base station with a location of the WCD corresponding with that RF signature, i.e., a location of the WCD at the same or substantially similar time when the WCD's coverage from the base station had that RF signature.

The computing system may also manage the data records 30 in various ways, for efficiency or improved performance. For example, the computing system could maintain individual data records for only a useful period of time, such as for several weeks or the like, on grounds that RF conditions at a particular location could change over time. As another example, the computing system could consolidate substantially matching data records. For instance, if there are multiple records for the same WCD with substantially unchanging location and substantially unchanging RF signature (e.g., with location and RF signature being close enough to support a conclusion that they were largely unchanged), the computing system could combine those records into one record, to avoid giving too much weight to a single WCD that may be substantially stationary. And if there are multiple records for different WCDs with substantially the same location and substantially the same RF signature, the computing system could combine those records into one and give it a higher weight for subsequent analysis, on grounds that multiple WCDs had substantially the same location when experiencing substantially the same RF conditions from the base station.

Figure 2:
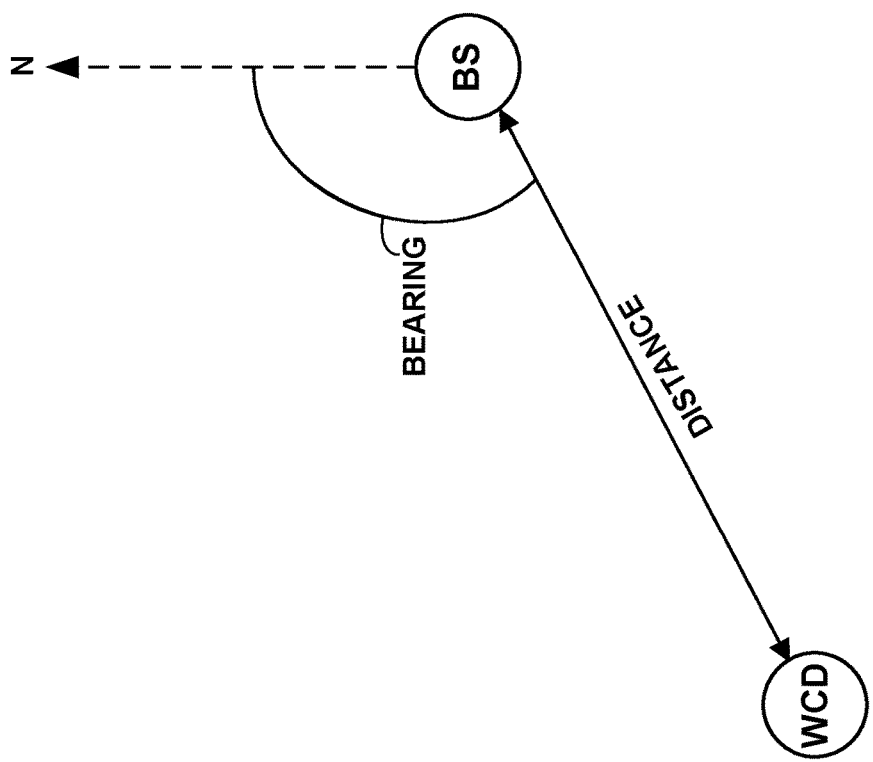
FIG. 2 is a depiction of bearing and distance of WCD location from base station location.

The location indicated by each data record 30 is thus optimally representative of WCD location for one or more WCDs having the associated RF signature of coverage from the indicated base station. Further, the computing system may include or have access to data that specifies the location (e.g., geographic coordinates) of each base station, keyed to base station identifier. Thus, as illustrated generally by FIG. 2, the WCD location indicated by each data record implicitly defines a bearing of the WCD from the base station, such as a vector direction (e.g., in degrees measured from true North) of a vector extending from the base station location to the WCD location for instance. Further, the WCD location indicated by each data record also implicitly defines a distance of the WCD from the base station, as the geometric distance between the base station location and the WCD location. The computing system could calculate and store this bearing and distance information in each data record or could determine the bearing and distance information, based on the base station location and WCD location, when necessary.

After or as the computing system engages in this learning process, the computing system may then receive a request for location of a WCD, where the WCD happens to be within coverage of just a single base station. In practice, for instance, the location determination system 22 may receive a request for the location of the WCD and, through control plane or user plane communication with the WCD or one or more other entities, may determine that the WCD is within coverage of just BS 1. For example, the location determination system may request the WCD to provide RF signature information for each base station whose coverage the WCD detects, and the WCD may respond with a report of RF signature for just BS1. As noted above, determining WCD location in such a single-base-station scenario could be problematic. But the presently disclosed process could help facilitate improved location determination in that scenario.

In accordance with the process, as discussed above, the computing system could receive an RF signature of the WCD's coverage from the base station (e.g., from BS1). For instance, if the location determination system 22 had received that RF signature from the WCD, the computing system could receive that received RF signature for processing. Alternatively, the computing system could request and receive the RF signature from the WCD or could receive the RF signature in another way.

Given the RF signature of the WCD's coverage from the base station, the computing system could then query the data records 30 to find multiple data records whose RF signatures of coverage from the same base station most closely match the RF signature of the WCD's coverage from the base station. Here, if RF signatures have multiple attributes, such as air interface signal delay, downlink receive signal strength, and downlink receive signal-to-noise ratio, for instance, the search for the multiple most closely matching RF signatures could involve a vector comparison between the WCD's RF signature and the RF signatures of data records 30. The multiple most closely matching data records could optimally be the top k most closely matching records, where k is a quantity determined to be sufficiently representative, such as two, three, or four, for instance.

Once the computing system has identified the multiple most closely matching data records 30, the computing system could then use the bearing and distance information from those identified data records as a basis to estimate a location of the WCD at issue. In particular, the computing system could combine the bearings defined by the locations of the multiple identified data records to establish a representative bearing from the base station, and the computing system could combine the distance defined by the locations of the multiple identified records to establish a representative distance from the base station. And the computing system could then deem the WCD's location to be a location having the determined representative bearing and determined representative distance from the base station. The computing system could take into account other factors as well in this process.

The act of combining the bearings of the multiple identified data records could involve computing an average of the bearings or otherwise statistically rolling up the bearings. And likewise, the act of combining the distances of the multiple identified data records could involve computing an average of the distances or otherwise statistically rolling up the distances. Such averages could be straight averages or weighted averages that account for weights such as those discussed above (e.g., where a given data record is representative of multiple WCDs that had the same or substantially similar RF signature of coverage from the base station and the same or substantially similar location).

Upon thereby estimating the location of the WCD, the computing system could then use the estimated location of the WCD as a basis to provide a location-based service, such as an emergency response service, a commercial service (e.g., location-based advertising), or a WCD-support service. For example, the computing system could ascertain information based on the estimated location (e.g., by querying a database that provides location-based information) and then using that information in some manner or providing the information to another entity for use. As another or related example, the computing system could provide the location for display in a map on a graphical user interface, such as to facilitate WCD-support services by a customer-care center or the like. And as another or related example, the computing system could report the estimated location to a location-based service provider, such as an emergency services center (e.g., public safety answering point), a commercial location-based service provider, or a customer care center, to enable the location-based service provider to a location-based service.

Figure 3:
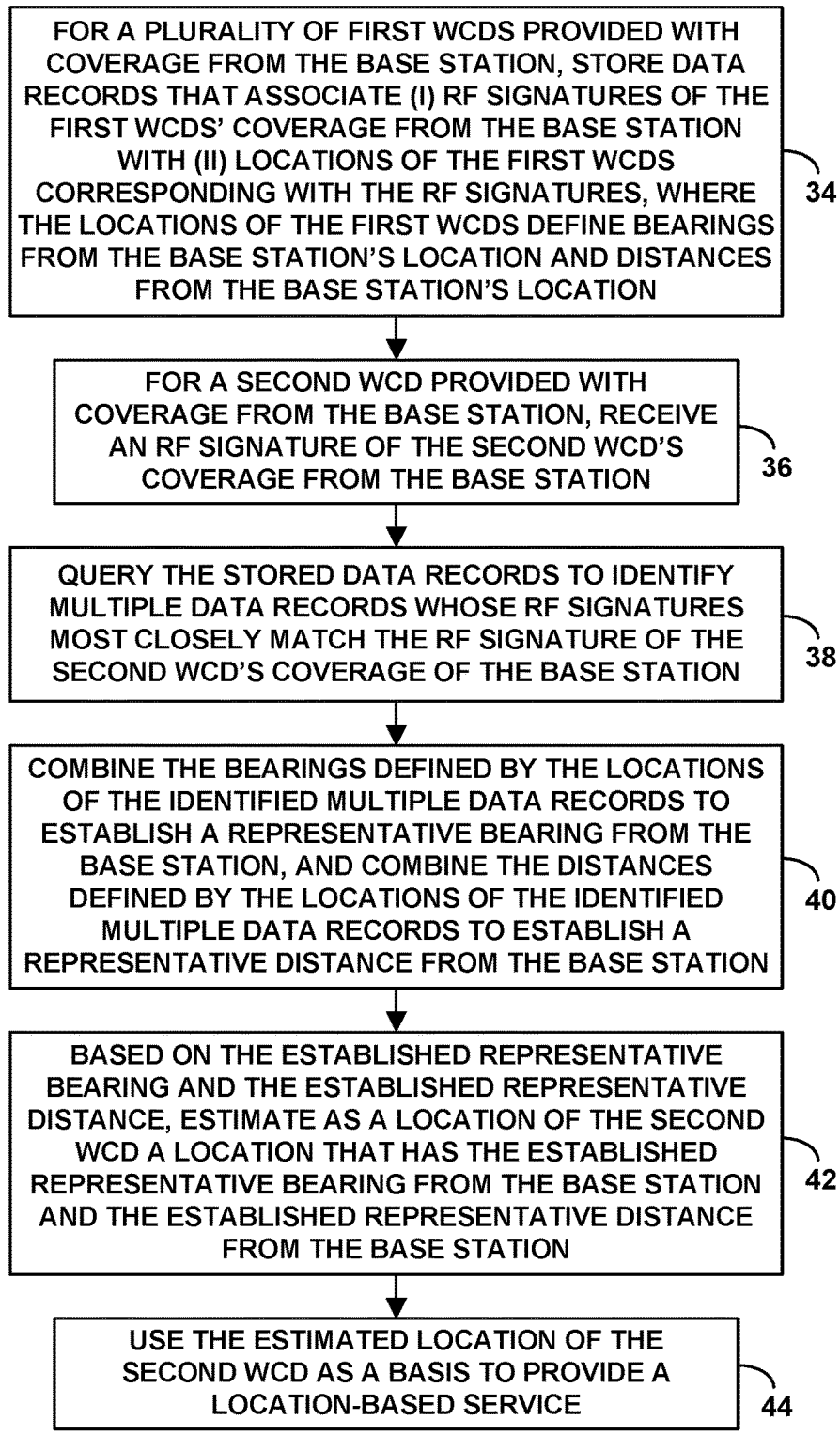
FIG. 3 is flow chart depicting example operations that can be carried out in accordance with the disclosure.

FIG. 3 is next a flow chart depicting operations that can be carried out in accordance with this disclosure, in line with the discussion above, to facilitate estimating and use of a device's location based on RF signature of wireless coverage from a single base station, where the base station is positioned at a location.

As shown in FIG. 3, at block 34, the operations include, for a plurality of first WCDs provided with coverage from the base station, storing data records that associate (i) RF signatures of the first WCDs' coverage from the base station with (ii) locations of the first WCDs corresponding with the RF signatures, where the locations of the first WCDs define bearings from the base station's location and distances from the base station's location. At block 36, which may occur in parallel with block 34, the operations include, for a second WCD provided with coverage from the base station, receiving an RF signature of the second WCD's coverage from the base station. Here, the second WCD could be a WCD other than the first WCDs or could be one of the first WCDs, but the second WCD is a WCD whose location is now at issue.

At block 38, the operations include querying the stored data records to identify multiple data records whose RF signatures most closely match the RF signature of the second WCD's coverage of the base station. And at block 40, the operations include combining the bearings defined by the locations of the identified multiple data records to establish a representative bearing from the base station, and combining the distances defined by the locations of the identified multiple data records to establish a representative distance from the base station.

At block 42, the operations then include, based on the established representative bearing and the established representative distance, estimating as a location of the second WCD a location that has the established representative bearing from the base station and the established representative distance from the base station. And at block 44, the operations include using the estimated location of the second WCD as a basis to provide a location-based service.

Figure 4:
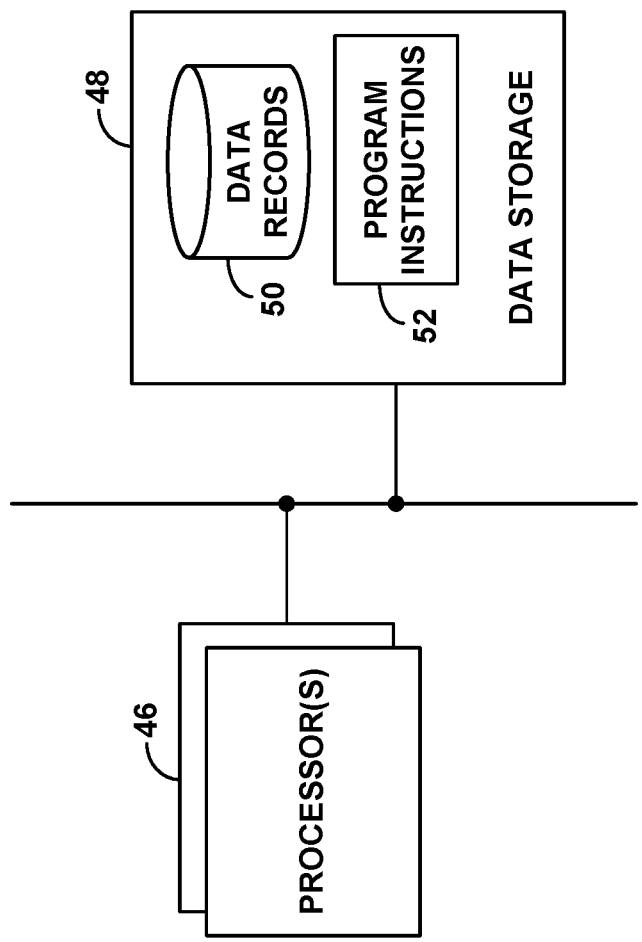
FIG. 4 is a simplified block diagram of a system operable in an accordance with the disclosure.

Finally, FIG. 4 is a simplified block diagram of an example system for estimating device location based on a RF signature of coverage from a single base station, where the base station is positioned at a location. This system could be embodied in the form of computing system 28 or could take other forms, among or as one or more servers and/or other components. As shown in FIG. 4, the system includes one or more processors 46 (e.g., one or more general purpose processors such as microprocessors, and/or one or more dedicated processors such as application specific integrated circuits, digital signal processing units, etc.), data storage 48 (e.g., one or more volatile and/or non-volatile storage components, such as magnetic, optical, or flash storage), data records 50 (e.g., a relational database, flat file listing, or the like) stored in the data storage, and program instructions 52 stored in the data storage and executable by the one or more processors to carry out various operations described herein.

In line with the discussion above, the data records stored in the data storage associate (i) RF signatures of first WCDs' coverage from the base station with (ii) locations of the first WCDs corresponding with the RF signatures, where the locations of the first WCDs define bearings of the first WCDs from the base station's location and distances of the first WCDs from the base station's location.

Further, also in line with the discussion above, the program instructions stored in the data storage are executable by the one or more processors to (a) receive an RF signature of a second WCD's coverage from the base station, (b) query the stored data records to find multiple data records whose RF signatures most closely match the RF signature of the second WCD, (c) combine the bearings defined by the locations of the identified multiple data records to establish a representative bearing from the base station, and combine the distances defined by the locations of the identified multiple data records to establish a representative distance from the base station, (d) based on the established representative bearing and the established representative distance, estimate as a location of the second WCD a location that has the established representative bearing from the base station and the established representative distance from the base station, and (e) use the estimated location of the second WCD as a basis to provide a location-based service.

Exemplary embodiments have been described above. It should be understood, however, that variations from these embodiments are possible, while remaining within the true spirit and scope of the invention.

We claim:

1. A method for estimating and use of device location based on a radio frequency (RF) signature of wireless coverage from a single base station, wherein the base station is positioned at a location, the method comprising:
    for a plurality of first wireless communication devices (WCDs) provided with coverage from the base station, storing data records that associate (i) RF signatures of the first WCDs' coverage from the base station with (ii) locations of the first WCDs corresponding with the RF signatures, wherein the locations of the first WCDs define bearings from the base station's location and distances from the base station's location;
    for a second WCD provided with coverage from the base station, receiving an RF signature of the second WCD's coverage from the base station;
    querying the stored data records to identify multiple data records whose RF signatures most closely match the RF signature of the second WCD's coverage of the base station;
    combining the bearings defined by the locations of the identified multiple data records to establish a representative bearing from the base station, and combining the distances defined by the locations of the identified multiple data records to establish a representative distance from the base station;
    based on the established representative bearing and the established representative distance, estimating as a location of the second WCD a location that has the established representative bearing from the base station and the established representative distance from the base station; and
    using the estimated location of the second WCD as a basis to provide a location-based service.

2. The method of claim 1, wherein each RF signature comprises data selected from the group consisting of (i) air interface signal delay, (ii) downlink receive signal strength, and (iii) downlink receive signal-to-noise ratio.

3. The method of claim 1, further comprising establishing the data records, wherein establishing the data records comprises using WCD-identification information and timestamp information cooperatively as a basis to correlate (i) RF signatures of the first WCDs' coverage from the base station with (ii) locations of the first WCDs.

4. The method of claim 3, wherein establishing the data records further comprises referring to service records to determine the RF signatures of the first WCDs' coverage from the base station and referring to location records to determine the locations of the first WCDs.

5. The method of claim 1, further comprising establishing the data records, wherein establishing the data records comprises rolling up multiple data records having substantially matching RF signatures and substantially matching locations.

6. The method of claim 1, wherein receiving the RF signature of the second WCD's coverage from the base station comprises receiving from the second WCD a report of the RF signature of the second WCD's coverage from the base station.

7. The method of claim 1, wherein each data record specifies (i) an RF signature of one or more first WCD's coverage from the base station and (ii) a location of the one or more first WCDs, and wherein querying the stored data records to find the multiple data records whose RF signatures most closely match the RF signature of the second WCD's coverage from the base station comprises:

comparing the RF signatures of the data records with the RF signature of the second WCD's coverage from the base station to identify the multiple data records.

8. The method of claim 1,
wherein combining the bearings defined by the locations of the identified multiple data records to establish a representative bearing from the base station comprises computing an average of the bearings, and
wherein combining the distances defined by the locations of the identified multiple data records to establish a representative distance from the base station comprises computing an average of the distances.

9. The method of claim 8, wherein the average of the bearings is a weighted average, and wherein the average of the distances is a weighted average.

10. The method of claim 1, wherein using the estimated location as a basis to provide a location-based service comprises:
ascertaining information based on the estimated location; and
using or providing the ascertained information.

11. The method of claim 1, wherein the location-based service comprises a service selected from the group consisting of (i) emergency response service, (ii) commercial service, and (iii) WCD-support service.

12. The method of claim 1, wherein using the estimated location as a basis to provide a location-based service comprises providing the estimated location for display in a map on a graphical user interface.

13. The method of claim 1, wherein using the estimated location as a basis to provide a location-based service comprises reporting the estimated location to a location-based service provider to enable the location-based service provider to provide the location-based service.

14. A system for estimating of device location based on a radio frequency (RF) signature of coverage from a single base station, wherein the base station is positioned at a location, the system comprising:
one or more processors;
data storage;
data records stored in the data storage, the data records associating (i) RF signatures of first wireless communication devices' (WCDs') coverage from the base station with (ii) locations of the first WCDs corresponding with the RF signatures, wherein the locations of the first WCDs define bearings of the first WCDs from the base station's location and distances of the first WCDs from the base station's location; and
program instructions stored in the data storage and executable by the one or more processors to (a) receive an RF signature of a second WCD's coverage from the base station, (b) query the stored data records to identify multiple data records whose RF signatures most closely match the RF signature of the second WCD, (c) combine the bearings defined by the locations of the identified multiple data records to establish a representative bearing from the base station, and combine the distances defined by the locations of the identified multiple data records to establish a representative distance from the base station, (d) based on the established representative bearing and the established representative distance, estimate as a location of the second WCD a location that has the established representative bearing from the base station and the established representative distance from the base station, and (e) use the estimated location of the second WCD as a basis to provide a location-based service.

15. The system of claim 14, wherein each RF signature comprises data selected from the group consisting of (i) air interface signal delay, (ii) downlink receive signal strength, and (iii) downlink receive signal-to-noise ratio.

16. The system of claim 14, wherein the program instructions are further executable b by the one more processors to establishing the data records, wherein establishing the data records comprises using WCD-identification information and timestamp information cooperatively as a basis to correlate (i) RF signatures of the first WCDs' coverage from the base station with (ii) locations of the first WCDs.

17. The system of claim 16, wherein establishing the data records comprises rolling up multiple data records having substantially matching RF signatures and substantially matching locations.

18. The system of claim 14, wherein each data record specifies (i) an RF signature of one or more first WCD's coverage from the base station and (ii) a location of the one or more first WCDs, and wherein querying the stored data records to find the multiple data records whose RF signatures most closely match the RF signature of the second WCD's coverage from the base station comprises:
comparing the RF signatures of the data records with the RF signature of the second WCD's coverage from the base station to identify the multiple data records.

19. The system of claim 14,
wherein combining the bearings defined by the locations of the identified multiple data records to establish a representative bearing from the base station comprises computing an average of the bearings, and
wherein combining the distances defined by the locations of the identified multiple data records to establish a representative distance from the base station comprises computing an average of the distances.

20. The system of claim 19, wherein the average of the bearings is a weighted average, and wherein the average of the distances is a weighted average.

* * * * *